A. S. NOONAN.
TIRE CHAIN APPLYING DEVICE.
APPLICATION FILED NOV. 11, 1919.
1,378,606.
Patented May 17, 1921.
2 SHEETS—SHEET 1.
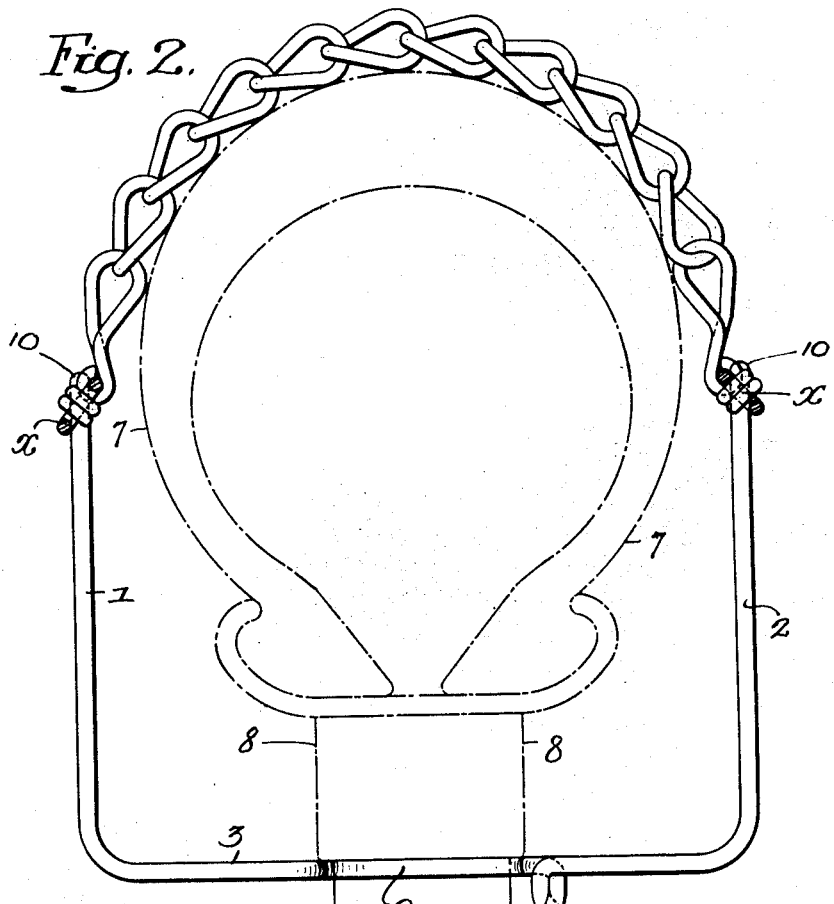
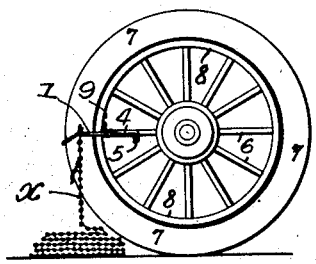
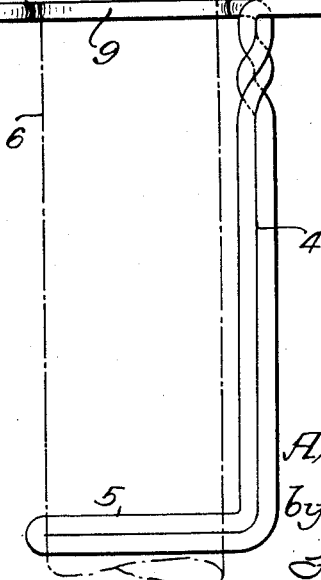
Inventor-
Albert S. Noonan,
by his Attorneys:
Howson & Howson

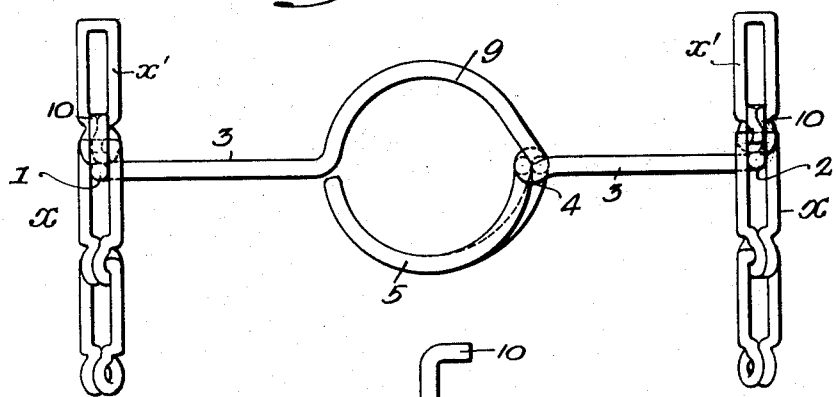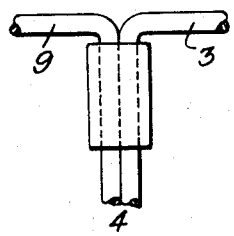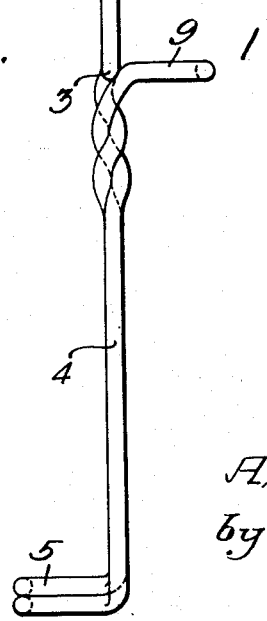

UNITED STATES PATENT OFFICE.

ALBERT S. NOONAN, OF PHILADELPHIA, PENNSYLVANIA, ASSIGNOR TO FOSS-HUGHES COMPANY, OF PHILADELPHIA, PENNSYLVANIA, A CORPORATION OF PENNSYLVANIA AND MASSACHUSETTS.

TIRE-CHAIN-APPLYING DEVICE.

1,378,606.     Specification of Letters Patent.     Patented May 17, 1921.

Application filed November 11, 1919. Serial No. 337,312.

*To all whom it may concern:*

Be it known that I, ALBERT S. NOONAN, a citizen of the United States, residing in Philadelphia, Pennsylvania, have invented Tire-Chain-Applying Devices, of which the following is a specification.

One object of this invention is to provide a relatively simple, easily applied and inexpensive device or structure for facilitating the application of a tire chain to a tire;—the construction being such as to temporarily hold one end of such chain adjacent the tire while the wheel including the latter is turned through one revolution so as to lay said chain around the same and so bring its second end into a position in which it may be conveniently connected to its first end.

These objects I attain as hereinafter set forth, reference being had to the accompanying drawings, in which, Figure 1 is a side elevation of a wheel illustrating my invention as applied thereto preparatory to drawing a tire chain around the tire;

Fig. 2 is a front elevation of my device showing a chain as attached to it;

Figs. 3 and 4 are respectively a plan and a side elevation of the device shown in Fig. 2, and Fig. 5 is a fragmentary elevation showing a modified means for holding together the upper part of the stem member of my device.

In constructing my invention I preferably utilize a single length of relatively stiff wire or light bar or rod material and form this, as by bending, so that it consists of a substantially U-shaped body portion having side members 1 and 2 and a connecting base member 3, a stem memer 4 projecting parallel to the side members and at right angles to the base member 3, and a spoke-engaging member 5 lying in a plane at right angles to the line of the stem member 4.

Both this spoke-engaging member and the stem member are made of two substantially parallel portions of the wire or rod of which the device is made and said spoke-engaging member is substantially semi-circular in outline so as to approximately fit around one of the wooden spokes 6 of an ordinary motor vehicle wheel having a pneumatic or solid tire 7 and a felly 8. The upper ends of the wire portions constituting the stem section 4 are tied together as by being twisted around each other, welded, soldered or embraced by a ferrule as in Fig. 5 and are thereafter extended in opposite directions to form the base 3 of the U-shaped body portion;—one of them being semi-circularly curved in a plane parallel to that of the section 5 to form a second spoke-engaging element 9, designed to fit around one of the spokes 6 on the side thereof opposite that engaged by the section 5.

The parts of the base portion 3 are so proportioned that the side members 1 and 2 of the body are parallel with and equi-distant from a straight line passing through the center of the spoke, and the stem member 4 is so spaced from this line (with which it also is parallel) as to lie immediately adjacent and parallel with the spoke. The free ends of the side members 1 and 2 are turned at right angles as indicated at 10 so as to extend parallel with each other and constitute chain engaging hooks, which will project upwardly when the spoke-engaging member 3 has been placed upon the upper side of the outer portion of a substantially horizontal spoke adjacent the rim and the member 5 engages the under side of said spoke near the hub of the wheel.

Two links $x$ adjacent the terminal links $x'$ of one end of a tire chain may then be applied to these hooks so that the main portion of said chain extends downwardly therefrom and to the ground surface at the rear of the wheel. If now the latter be turned in a clockwise direction, the chain is drawn around the tire until, when one revolution of the wheel has been completed, its free end extends immediately adjacent the end which is engaged by the hooks 10. The links of the supported end and the terminal links of the free end are now connected in the customary manner;—my device being then removed from the spoke 6 on which it has been mounted merely by raising its outer end until its member 9 clears the spoke and thereafter moving it outwardly until it is completely disengaged. Obviously the device may be readily manufactured from inexpensive material particularly if forms or jigs be used and its nature is such as to make possible its application to a wheel and its removal therefrom a matter of short time and of the greatest convenience.

I claim:

1. A tire chain attaching device consisting of a forked body section having a portion formed to engage a spoke of a wheel; a stem section projecting from said body; and a second spoke-engaging section projecting from said stem section substantially parallel to the first named spoke-engaging portion.

2. A tire chain attaching device consisting of a length of rod material having a substantially U-shaped body formed to extend on opposite sides of a tire and including a base portion curved laterally to fit around a wheel spoke; a stem projecting from the base at one end of the spoke-engaging part thereof; with a second spoke-engaging section projecting from said stem and formed to engage the part of a spoke opposite that engaged by said base.

3. A tire chain attaching device consisting of a length of rod material having parallel portions bent to form a spoke-engaging section and a stem section and having its end portions extended in opposite directions from the stem section to form a substantially U-shaped body including a second spoke-engaging part oppositely curved from the first named spoke-engaging section.

4. A tire chain attaching device consisting of a length of rod material having parallel portions bent to form a curved spoke-engaging section and a stem section and having its end portions extended in opposite directions from the stem section to form a substantially U-shaped body including a second spoke-engaging part oppositely curved from the first named spoke-engaging section, the two parallel portions of the material constituting the stem being twisted together adjacent its junction with the body portion.

5. A tire chain attaching device consisting of a length of rod material having parallel portions bent to form a curved spoke-engaging section and a stem section and having its end portions extended in opposite directions from the stem section to form a substantially U-shaped body including a second spoke-engaging part oppositely curved from the first named spoke-engaging section, the two parallel portions of the material constituting the stem being connected together adjacent its junction with the body portion.

In witness whereof I affix my signature.

ALBERT S. NOONAN.